US006795706B1

(12) United States Patent
Cheng

(10) Patent No.: US 6,795,706 B1
(45) Date of Patent: Sep. 21, 2004

(54) EFFICIENT DIRECT CALL DATABASE MANAGEMENT FOR MOBILE DEVICES WITH LIMITED NON-VOLATILE MEMORY

(75) Inventor: Steven D. Cheng, San Diego, CA (US)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 10/249,441

(22) Filed: Apr. 10, 2003

(51) Int. Cl.[7] ............................................... H01S 4/00
(52) U.S. Cl. .................................. 455/436; 455/556.2
(58) Field of Search ............................. 455/432.1, 436, 455/556.2, 560; 379/45

(56) References Cited

U.S. PATENT DOCUMENTS

2002/0019430 A1 * 2/2002 Surila et al. ................ 709/218
2003/0000091 A1 * 1/2003 Oxley ........................... 379/38
2003/0005480 A1 * 1/2003 Bridges et al. ............. 455/419
2003/0022281 A1 * 1/2003 Karr et al. ................... 342/457

* cited by examiner

*Primary Examiner*—Creighton Smith
(74) *Attorney, Agent, or Firm*—Winston Hsu

(57) ABSTRACT

27A central database is provided on an external device, such as a personal data assistant (PDA), that is used for local phone number translation. A communications link is provided between a mobile telephone and the central database to allow accessing and indexing of the central database. The mobile telephone obtains identification information from a base station upon which the mobile telephone is camped. The communications link is used to extract local phone number translation information from the central database by indexing with the identification information to obtain corresponding local phone number translation information. The mobile telephone then provides local phone number translation using the local phone number translation information.

20 Claims, 6 Drawing Sheets

EFFICIENT DIRECT CALL DATABASE MANAGEMENT FOR MOBILE DEVICES WITH LIMITED NON-VOLATILE MEMORY

BACKGROUND OF INVENTION

1. Field of the Invention

The present invention relates to local phone number translation for a mobile device. More specifically, utilization of an external database to provide local phone number translation is disclosed for mobile telephones having limited amounts of non-volatile memory.

2. Description of the Prior Art

The single telephone number service arrangement allows users to easily recall service numbers, and thereby obtain corresponding services over the telephone. Regardless of location, the single service number should remain the same for a particular service. Examples of such services in the United States include the 9-1-1 emergency service, and the 4-1-1 directory assistance service.

Although such single telephone number service numbers remain the same within a country, they tend to vary from country to country. This fact, when taken in conjunction with the roving ability of mobile telephones, tends to insert confusion into the lives of the users of such mobile telephones when traveling from country to country. For example, as a resident in country "A", a user may be accustomed to dialing "911" to obtain an emergency service provider. Yet, while abroad in foreign country "B", the telephone number "911" may have no meaning for the local service provider. Instead of connecting to an emergency operator, dialing the "911" number may simply lead to an error message. This, of course, is at least an inconvenience to the user.

The most obvious solution to this problem is to enable local phone number translation based upon region. For example, assume that in country "B" the number for emergency services is "119". A database is provided in the mobile telephone that can be indexed based upon region and the desired local service number, such as "911". The result of this database look-up is the translated local service number, such as "119". All of this occurs automatically, so that when the user keys in "911", the mobile telephone actually dials "119", and thus properly connects to the desired local service.

Although simple in principle, actually implementing the above can be challenging. The first obstacle is identifying the region within which the mobile device is present. One possible solution for this is simply to let the user indicate his or her current geographic location. This, however, is inconvenient and inefficient, as the user may forget to properly enter the current region, and thus render useless any translated local service numbers. A second, and no less pressing problem, is that the non-volatile memory resource within a mobile telephone is generally quite limited, whereas a database that is capable of performing translation for local service numbers in all regions of the world may be inordinately large.

SUMMARY OF INVENTION

It is therefore a primary objective of this invention to provide local phone number translation for a mobile device, such as a mobile telephone, having limited memory stores.

Briefly summarized, the preferred embodiment of the present invention discloses direct call management for mobile devices with limited memory resources. Initially, a central database is provided on an external device, such as a personal data assistant (PDA) or an optical storage device, that is used for local phone number translation. A communications link is enabled between the mobile device and the central database to allow accessing and indexing of the central database. The mobile device obtains identification information from a base station within the receiving range of the mobile device. Ideally, this is the base station upon which the mobile device is camped. The communications link is used to extract local phone number translation information from the central database according to the identification information. That is, the identification information of the base station is used to index into the central database to obtain corresponding local phone number translation information. The mobile device then provides local phone number translation using the local phone number translation information. When the mobile device camps upon a new base station, the old local phone number translation information can be discarded in favor of new local phone number translation information that is obtained from the central database by indexing with identification information obtained from the new base station.

It is an advantage of the present invention that by providing an external database that is indexed by way of base station identification information, the present invention is able to provide local phone number translation information for a large number of regions, while simultaneously keeping within the memory restraints of the mobile device.

It is a further advantage that local phone number translation information that is not needed can be discarded from the memory of the mobile device, thus freeing up valuable memory resources without compromising the local phone number translation abilities of the mobile device.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
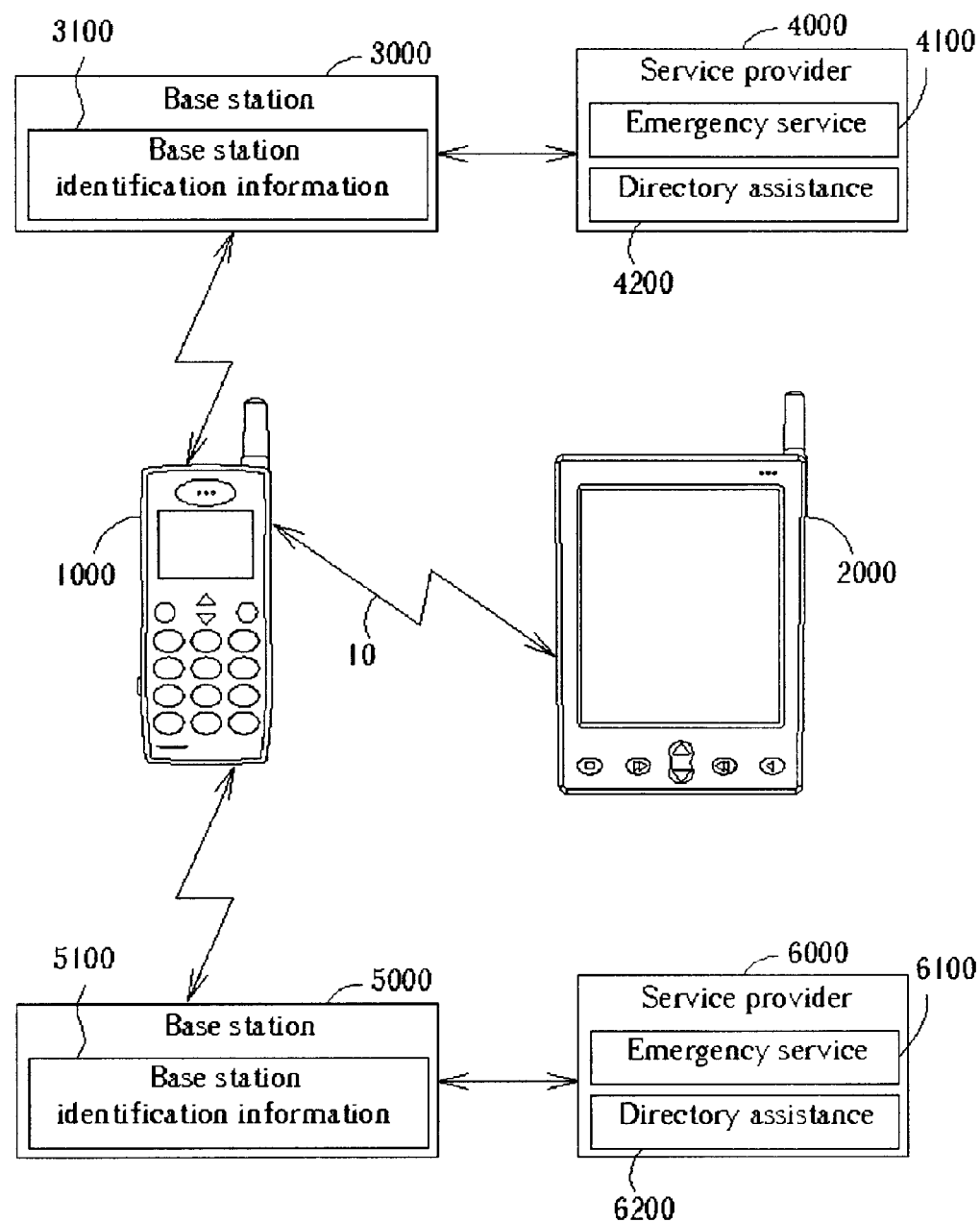
FIG. 1 depicts a preferred arrangement of the present invention.
Figure 2:
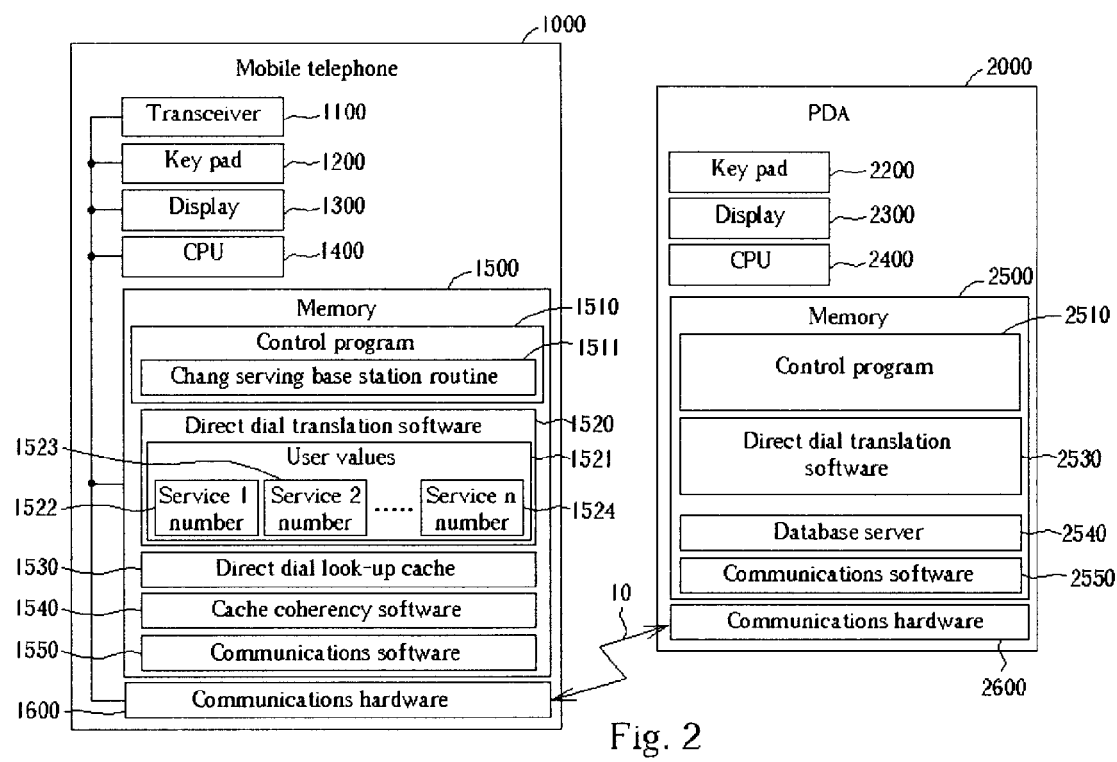
FIG. 2 is a block diagram of the arrangement depicted in FIG. 1.

Please refer to FIGS. 1 and 2. FIG. 1 depicts a preferred embodiment arrangement of the present invention. FIG. 2 is a block diagram of the arrangement depicted in FIG. 1. The preferred embodiment of the present invention utilizes a mobile telephone 1000 that is in communications with a portable computing platform, in this case a personal data assistant (PDA) 2000. Other computing devices could be substituted in place of the PDA 2000, such as a laptop computer or a tablet PC. The functionality required of the portable computing device, as served by the PDA 2000, should become clear after reading the following detailed description, and hence suitable substitutes to the PDA 2000 should also become clear to one reasonably skilled in the art. Communications between the mobile telephone 1000 and the PDA 2000 is effected by way of a communications link 10. The communications link 10 may be a wired or wireless link. Exampled of wireless links include Bluetooth and Infrared (IR) links. The most common wired links are Universal Serial Bus (USB) and IEEE 1394 (FireWire). Other types of links are certainly possible, though, so long as the communications link 10 enables satisfactory communications between the mobile telephone 1000 and the PDA 2000 as described below.

The mobile telephone 1000 includes a transceiver 1100 for sending and receiving wireless signals with base stations 3000, 5000. As is well known in the field of mobile telephony, the base station 3000, for example, is used to connect the mobile telephone 1000 to a local service provider 4000. Amongst other services, and simply by way of example, the local service provider 4000 may provide an emergency service 4100, and a directory assistance service 4200. The telephone numbers for the emergency service 4100 and the directory assistance service 4200 may change with different local service providers 4000, 6000, and hence may change when the mobile telephone 1000 camps upon a new base station 5000.

The mobile telephone 1000 also includes a keypad 1200 to accept input from a user, such as telephone numbers to be called; a display 1300 to provide visual output to the user; memory 1500 for storing programs and data; communications hardware 1600 to establish the communications link 10, and a central processing unit (CPU) 1400 to control operations of the mobile telephone 1000. The CPU 1400 is electrically connected to, and able to control and receive information from, the transceiver 1100, the keypad 1200, the display 1300 and the communications hardware 1600 in a manner well known to those in the art. The CPU 1400 is also electrically connected to the memory 1500, and is in turn controlled by programs residing within the memory 1500. The memory 1500 may be a combination of volatile and non-volatile memory. For purposes of the present invention, only the non-volatile region of the memory 1500 is considered.

A control program 1510 provides the major functionality of the mobile telephone 1000, and may be thought of as the "operating system" of the mobile telephone 1000. For the preferred embodiment, it is assumed that the control program 1510 provides GSM-related functionality. Other wireless standards, such as 3GPP, are also applicable to the present invention, and GSM is assumed for exemplary purposes only. Under the direction of the control program 1510, other routines may be called to support the present invention, and which are described in detail in the following. Coding such routines should be routine for one reasonably skilled in the art after reading the following detailed description.

Communications software 1550 is provided in the memory 1500 to serve as a device driver for the communications hardware 1600, and to allow other application programs in the memory 1500 to easily use the communications hardware 1600 to establish the communications link 10.

The memory 1500 includes a direct dial look-up cache 1530. In the preferred embodiment, this direct dial look-up cache 1530 simply stores a portion of a direct dial central database 2530 that is stored on the PDA 2000. Direct dial translation software 1520 utilizes the direct dial look-up cache 1530 to translate telephone numbers familiar to the user into corresponding numbers that are recognized by the service provider 4000, 6000. Cache coherency software 1540 interfaces with the communications software 1550 to extract needed portions from the direct dial central database 2530 on the PDA 2000 to keep the direct dial look-up cache 1530 fresh. The cache coherency software 1540 determines whether or not the direct dial look-up cache 1530 needs to be refreshed according to information received from the control program 1510 that indicates that the mobile telephone 1000 is changing to a new base station 3000, 5000.

An aspect common to all mobile telephony is that of the mobile telephone 1000 roaming about and consequently switching from one base station 3000 to another base station 5000, and consequently being served by a new service provider 6000, which may have different numbers for the same common services. Hence, the number used to access an emergency service 6100 in the second service provider 6000 is not necessarily the same as that used to access the emergency service 4100 in the first service provider 4000. Directory assistance 6200 in the second service provider 6000 may also have a different telephone number than that in the first service provider 4000. To enable the mobile telephone 1000 to switch base stations 3000, 5000, each base station 3000, 5000 transmits respective base station identification information 3100, 5100 that is utilized by the control program 1510, and specifically by a change serving base station routine 1511 in the control program 1510.

Initially, the mobile telephone 1000 is camped on the first base station 3000. As the mobile telephone roams closer to the second base station 5000, a decision is eventually made to cause the mobile telephone 1000 to camp on the second base station 5000, which is termed a handover. The change serving base station routine 1511 utilizes the base station identification information 3100, 5100 to negotiate with both the first and second base stations 3000, 5000 to realize the handover. At the end of the handover process, the mobile telephone 1000 is camped upon the second base station 5000, and so lies under the realm of the second service provider 6000. When the change serving base station routine 1511 performs the serving base station handover, the routine 1511 provides a mechanism to so inform other programs in the mobile telephone 1000. This mechanism, and related handover procedure, is well known to those in the art of mobile communications.

The base station information 3100, 5100 uniquely identifies each base station 3000, 5000 around the world. In the GSM standard, each base station 3000, 5000 broadcasts a Mobile Country Code (MCC), Mobile Network Code (MNC), Location Area Code (LAC) and cell ID. This combined information (MCC, MNC, LAC and cell ID) is enough to serve as unique bas station identification information 3100, 5100. For purposes of the present invention, the base station identification information 3100, 5100 may be used as is as identification information, or may be hashed to a smaller bit size to conserve space, while continuing to uniquely identify each base station 3000, 5000. Of course, if a hash function is utilized, then the hash function performed by the mobile telephone 1000 on the base station identification information 3100, 5100 must be identical to that used to generate the direct dial central database 2530 on the PDA 2000. This should be clear from the following. Although with many variations, hashing is a commonly known programming tool, and so is not elaborated upon here.

The purpose of the PDA 2000 is to provide the contents of the direct dial central database 2530 to the mobile telephone 1000. The PDA 2000 includes a key pad 2200 and a display 2300 for user input/output (I/O), and communications hardware 2600 to provide the communications link 10. A CPU 2400 controls the overall operations of the PDA 2000, and is in turn controlled by a control program 2510 in the memory 2500 of the PDA 2000. The control program 2510 serves as the operating system of the PDA 2000. As a portable computing device, the PDA 2000 is generally equipped with a much larger memory 2500 than that of the mobile telephone 1000, and so is much better able to store the direct dial central database 2530. The direct dial central database 2530 is stored in non-volatile memory of the PDA 2000. Communications software 2550 serves as a device driver for the communications hardware 2600, enabling other software in the memory 2500 to more easily establish and use the communications link 10. A database server 2540 runs under the control program 2510, and utilizes the communications software 2550 to interface with the cache coherency software 1540 on the mobile telephone 1000. In effect, the cache coherency software 1540 may be thought of as a client that makes requests to the database server 2540 via the communications link 10. The database server 2540 responds to these requests with appropriate portions of the direct dial central database 2530, which are then provided to the cache coherency software 1540 via the communications link 10, and hence inserted into the direct dial look-up cache 1530 as required.

Figure 3:
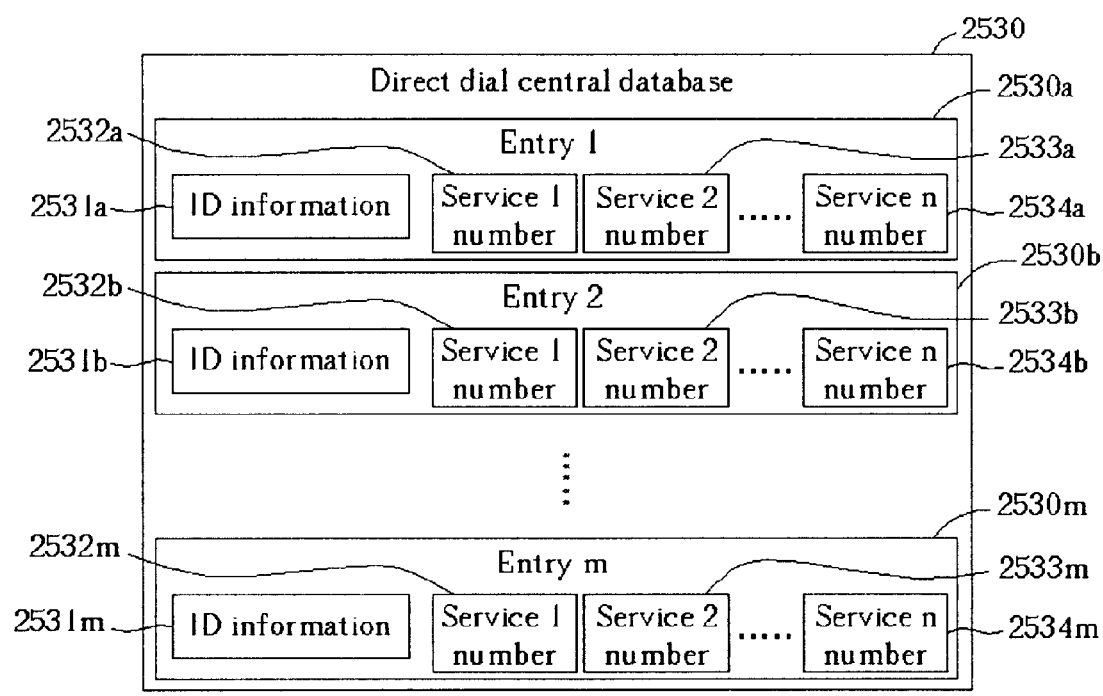
FIG. 3 is a block diagram of a direct dial central database shown in FIG. 2.

Please refer to FIG. 3 with reference to FIGS. 1 and 2. FIG. 3 is a block diagram of the direct dial central database 2530. The direct dial central database 2530 contains a plurality of entries 2530a–2530m. Each entry has a corresponding ID information field 2531a–2531m. Each ID information field 2531a–2531m uniquely identifies a base station located somewhere in the world. Hence, the first base station 3000 may have the entry 2530a, with the ID information 2531a corresponding to the base station identification information 3100. ID information 2531–2531m may, in fact, simply be the base station identification information broadcast by the respective base station, or may be the hashed value of the base station identification information, as indicated above, so as to conserve space within the direct dial central database 2530. Each entry 2530a–2530m further contains a corresponding set of service numbers 2532a–m, 2533a–m, 2534a–m. Each service number corresponds to a single service telephone number with which the user is familiar, and thus provides local phone number translation information. For example, each service number 2534a–2534m may correspond to the emergency service number of the service provider connected to the associated base station. In this example, if entry 1 2530a corresponds to the first base station 3000, then ID information 2531a would correspond to the base station identification information 3100 (hashed or exact, depending upon the implementation), and service 1 number 2532a would hold the number for the emergency service 4100. If entry 2 2530b corresponds to the second base station 5000, then ID information 2531b would correspond to the base station identification information 5100 (hashed or exact), and service 1 number 2532b would hold the number for the emergency service 6100. Similarly, service 2 numbers 2533a–2533m may correspond, for example, to a directory assistance number with which the user is familiar. In this case, service 2 number 2533a would hold the telephone number for the directory assistance service 4200, and service 2 number 2533b would hold the telephone number for the directory assistance service 6200. The number of service numbers provided in each entry 250a–2530m is implementation specific, and may be zero or greater, zero being the special case for which no direct dial translation is possible for the associated service provider. The direct dial central database 2530 should have a sufficient number of entries 2530a–2530m to cover all regions within which the mobile telephone 1000 may roam. That is, for any base station from which the mobile telephone 1000 may receive base station identification information, the direct dial central database 2530 should ideally have a corresponding entry 2530a–2530m for that base station.

Figure 4:
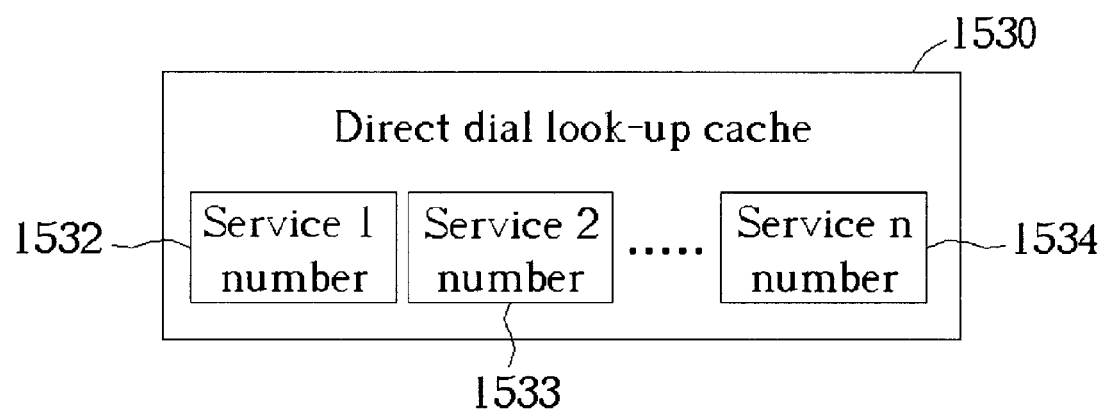
FIG. 4 is a block diagram of a first embodiment for a direct dial look-up cache depicted in FIG. 2.

Please refer to FIG. 4 with reference to FIGS. 1–3. FIG. 4 is a block diagram of a first embodiment for the direct dial look-up cache 1530 for the mobile telephone 1000. In the simplest embodiment, the direct dial look-up cache 1530 holds local phone number translation information 1532, 1533, 1534 obtained from a single entry 2530a–2530m extracted from the direct dial central database 2530 on the PDA 2000. The direct dial translation software 1520 utilizes the local phone number translation information 1532, 1533, 1534 to translate any service number input by the user. This translated number is then dialed, instead of the user-supplied number. To perform this translation, the direct dial translation software 1520 holds a list of user values 1521 that the user associates with a service. These values 1522–1524 correspond to the local phone number translation information 1532–1534, respectively, and thus by extension to the local phone number translation information held in each entry 1530a–2530m in the direct dial central database 2530. When a user types in a number on the keypad 1200 and then sends this number off to be dialed, the direct dial translation software 1520 scans for the user-entered number in the user values 1521. If a match is found, a corresponding entry 1532, 1533, 1534 is indexed from the direct dial look-up cache 1530 and dialed instead of the user-supplied number. This translated number may be optionally displayed on the display 1300.

To better explain the present invention, consider the following scenario: The mobile telephone 1000 is turned on and camps on the first base station 3000. In this region, emergency service 4100 has a number "119", and directory assistance 4200 has a number "104". Entry 1 2530a corresponds to base station 3000, and so ID information 2531a corresponds to the base station identification information 3100. Service 1 number 2532a thus holds a value of "119", and service 2 number 2533a holds a value of "104". Within the mobile telephone 1000, assume that the user is accustomed to emergency services as being "911", and directory assistance being "411". Within the user values 1521, then, service 1 number 1522 would be "911", and service 2 number 1523 would be "411". When the mobile phone 1000 camps on the first base station 3000, the control program 1510 generates a signal indicating this, which is caught by the cache coherency software 1540 in a manner familiar to those in the art. The cache coherency software 1540 utilizes the base station identification information 3100 received from the base station 3000 to generate associated ID information for the base station 3000. The cache coherency software 1540 liaisons with the database server 2540, sending a request over the communications link 10 via the communications software 1550, 2550 and the communications hardware 1600, 2600. This request includes the ID information obtained from the base station identification information 3100. The database server 2540 indexes into the direct dial central database 2530, looking for an ID information entry 2531a–2531m that matches the request. In this case, ID information 2531a would match. In response, the database server 2540 then sends the local phone number translation information 2532a–2534a of entry 1 2530a to the cache coherency software 1540. The cache coherency software 1540 slots this returned information into the direct dial look-up cache 1530, so that service 1 number 1532 would be "119" (the value stored in service 1 number 2532*a*), and service 2 number 1533 would be "104" (the value stored in service 2 number 2533*a*). Suppose, then, that the user wishes to contact the directory assistance service 4200. The user dials "411", despite the fact that this number may have no meaning for the service provider 4000. The control program 1510 passes the user supplied number "411" to the direct dial translation software 1520, which then scans the user-supplied number against the user values 1521. In this case, a match is found with service 2 number 1523, and the direct dial translation software 1520 consequently indexes into the direct dial look-up cache 1530 to extract the corresponding service 2 number entry 1533, which is "104". The number "104" is then passed by the direct dial translation software 1520 to the control program 1510 for dialing. The user is therefore properly connected to the directory assistance service 4200 at number "104", despite having dialed the number "411". In the event that no match is found in the user values 1521 for the user-supplied number, the user-supplied number is simply given back to the control program 1510.

As the mobile telephone 1000 roams and camps on different base stations, a procedure similar to the above occurs. For example, the mobile telephone 1000 may roam from the first base station 3000 to the second base station 5000. When this occurs, the change serving base station routine 1511 is called to cause a serving base station reselection procedure so that the mobile telephone 1000 will camp on the second base station 5000. Upon completion of this serving base station reselection procedure, the change serving base station routine 1511 informs other programs in the memory 1500 that the mobile telephone is now camped upon the new, second base station 5000. The cache coherency software 1540 catches this signal from the change serving base station routine 1511, generates ID information from the second base station identification information 5100, and sends a corresponding request with the ID information to the database server 2540 on the PDA 2000. Assuming that entry 2 2530*b* corresponds to the second base station 5000, holding local phone number translation information 2432*b*–2534*b* for the second service provider 6000, the database server 2540 responds by sending the local phone number translation information 2532*b*–2534*b* back to the cache coherency software 1540, since that ID information 2531*b* in entry 2 2530*b* corresponds to the base station identification information 5100. In this manner, the direct dial look-up cache 1530 is refreshed with local phone number translation information 1532–1534 for the service provider 6000.

The above first embodiment for the direct dial look-up cache 1530 keeps the memory requirements for the direct dial translation software 1520 to a minimum. A potential drawback to this embodiment, though, is that delays may be incurred while the cache coherency software 1540 refreshes the direct dial look-up cache 1530. This may be inconvenient for the user. To resolve this issue, the preferred embodiment of the direct dial look-up cache 1530 holds local phone number translation information for not only the base station upon which the mobile telephone 1000 is camped, but also neighboring base stations. As the mobile telephone 1000 roams, base stations that do not neighbor the serving base station can be removed from the direct dial look-up cache 1530 to free up memory 1500 resources.

Figure 5:
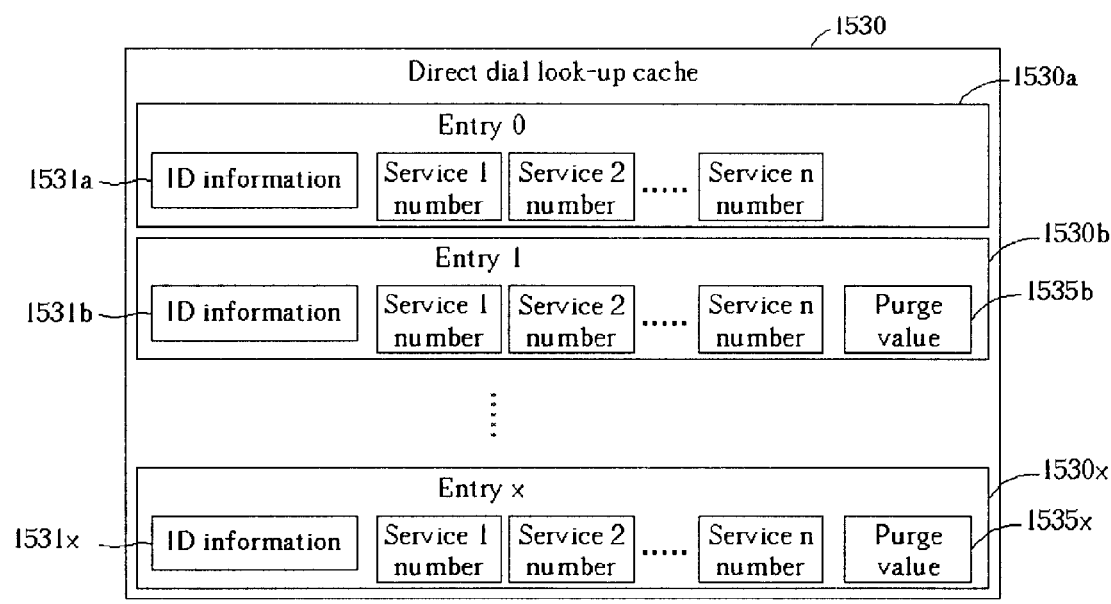
FIG. 5 is a block diagram of a preferred embodiment for the direct dial look-up cache depicted in FIG. 2.

Please refer to FIG. 5 with reference to FIGS. 1–3. FIG. 5 is a block diagram of the preferred embodiment of the direct dial look-up cache 1530. Entry 0 1530*a* holds the local phone number translation information for the base station upon which the mobile telephone 1000 is camped (the serving base station), and is analogous to the first embodiment direct dial look-up cache 1530 depicted in FIG. 4, but for the addition of the ID information 1531*a*. The ID information 1531 a simply holds the ID information of the serving base station, and is present for the event that entry 0 1530*a* is eventually swapped with one of the other entries 1530*b*–1530*x*. The direct dial translation software 1520 utilizes entry 0 1530*a* to perform the local phone number translation, in the manner described above. Entry 1 1530*b* to entry x 1530*x* hold local phone number translation information for base stations that neighbor the serving base station, or which have previously been within the receiving range of the mobile telephone 1000. Entry 1 1530*b* to entry x 1530*x* are basically copies of corresponding entries 2530*a*–2530*m* in the direct dial central database 2530, but for the addition of a respective purge value 1535*b*–1535*x*. The purge values 1535*b*–1535*x* are used to determine which respective entry 1530*b*–1530*x* should be removed from the memory 1500, or replaced by another entry 2530*a*–2530*m* from the PDA 2000. Entry 0 1530*a* needs no purge value, as entry 0 1530*a* is always present to perform the local phone number translation. The local phone number translation information within entry 0 1530*a*, however, can be swapped with the local phone number translation information contained in the entries 1530*b*–1530*x*, or replaced by a new entry 2530*a*–2530*m* received from the PDA 2000.

Figure 6:
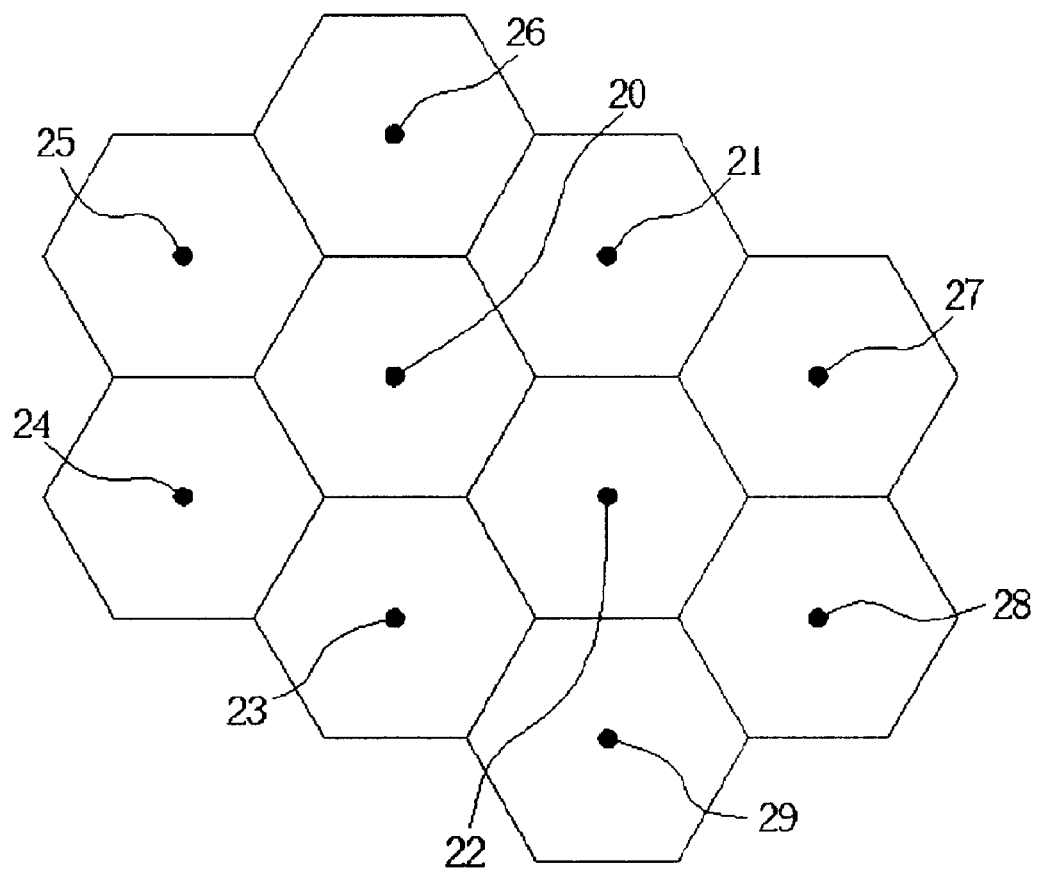
FIG. 6 depicts a cellular arrangement of base stations.

Please refer to FIG. 6, with reference to FIGS. 1–3 and FIG. 5. FIG. 6 depicts a cellular arrangement of base stations 20–29. For the following, it is assumed that the mobile telephone 1000 is camped on a base station 20 in FIG. 6. Entry 0 1530*a* would thus contain local phone number translation information for the base station 20, obtained from the PDA 2000 as described previously. Geographically surrounding the base station 20 are base stations 21–26. In GSM, a Broadcast Channel (BCCH) Allocation List (BA List) is broadcast by every base station 20–26, which provides information about neighboring base stations 20–26. In particular, the cache coherency software 1540 utilizes the BA List as provided by the serving base station 20 to obtain the ID information of the neighboring base stations 21–26. For every neighboring base station 1530*b*–1530*x* whose corresponding ID information is not present within the ID information 1531*b*–1531*x*, the cache coherency software 1540 utilizes the ID information of that neighboring base station 21–26 to send a corresponding request to the database server 2540. The response from the database server 2540 is used to fill a respective entry slot 1530*b*–1530*x* within the direct dial look-up cache 1530. Each newly-added entry 1530*b*–1530*x* is given a default respective purge value 1535*b*–1535*x*, such as "1". Entries 1530*b*–1530*x* that are not provided new local phone number translation information, and that do not correspond to one of the neighboring base stations 21–26, have their respective purge values 1535*b*–1535*x* incremented. Entries 1530*b*–1530*x* that correspond to one of the neighboring base stations 21–26 all have their respective purge values 1535*b*–1535*x* set to the default value, i.e., "1". As a result of this, all of the entries 1530*b*–1530*x* for neighboring base stations 21–26 have respective purge values 1535*b*–i 535*x* fixed to the default value, i.e., "1", whereas entries 1530*b*–1530*x* corresponding to non-neighboring base stations 27–29 have purge values 1535*b*–1535*x* that are greater than the fixed value, and that increment with each refreshing of the direct dial look-up cache 1530, so long as they continue to remain non-neighboring base stations 27–29.

Because local phone number translation information for the neighboring base stations 21–26 is kept in the direct dial look-up cache 1530, delays introduced by refreshing the direct dial look-up cache 1530 are avoided. For example, if the mobile telephone 1000 is camped upon base station 20, then entry 0 1530a will contain the local phone number translation information required for base station 20. Local phone number translation information for neighboring base stations 21–26 will be present within entries 1530b–1530x, with respective default purge values 1535b–1535x of "1". Assume, for the sake of example, that local phone number translation information for base station 22 is present in entry 1 1530b, and that the mobile telephone 1000 undergoes serving base station reselection from base station 20 to base station 22. When the cache coherency software 1540 is informed by the control program 1510 of the new serving base station 22, the cache coherency software 1540 first scans the entries 1530b–1530x for the ID information of the new serving base station 22, finding it in the ID information 1531 b of entry 1 1530b. In response to this, the cache coherency software 1540 swaps entry 1 1530b and entry 0 1530a. Purge value 1535b should already be in the default state, but can be set to the default state just to be sure. This swapping operation is extremely quick, and so the user will notice no delays imposed while the direct dial translation software 1520 waits for the new entry 0 1530a local phone number translation information for the new serving base station 22. The cache coherency software 1540 can then update the direct dial look-up cache 1530 as described above, utilizing the BA List from the new serving base station 22, without delaying the direct dial translation software 1520. Of course, if the local phone number translation information for the new serving base station 22 is not present in the direct dial look-up cache 1530, the cache coherency software may request it from the PDA 2000. The cache coherency software 1550 will ensure that the entries 1530b–1530x are populated with the local phone number translation information for the new neighboring base stations 20, 21, 23, 27, 28 and 29, setting their respective purge values 1535b–1535x to the default "1". Non-neighboring base stations 24, 25 and 26 that are already present in the direct dial look-up cache 1530 have the purge values 1535b–1535x of their corresponding entries 1530b–15030x incremented to "2".

In the event that the memory 1500 becomes too full, or the size of the direct dial look-up cache 1530 is deemed too large, entries 1530b–1530x with the highest respective purge values 1535b–1535x can be removed from the memory 1500, thus freeing up memory 1500 resources. When loading new local phone number translation information from the PDA 2000, the cache coherency software 1540 may optionally write over those entries 1530b–1530x that have the largest respective purge values 1535b–1535x, and deciding when to do so is a implementation choice. In the event that a very limited number of total entries 1530b–1530x are available for the direct dial look-up cache 1530, the cache coherency software 1540 should request the local phone number translation information from the database server 2540 for those base stations having the highest running average Received Signal Strength Indicator (RSSI) value, as these tend to be the geographically closest base stations. Additionally, the BA List provided by base stations does not always contain all neighboring base stations, for example due to billing concerns. However, all base stations broadcast identification information at specific, predefined frequencies. It is therefore possible to scan all potential base station broadcast frequencies to detect the presence of all local base stations within the receiving range of the mobile telephone 1000. Again, when doing so, it is best to select for caching those base stations that have the highest running average RSSI values.

In contrast to the prior art, the present invention interfaces a mobile communications device with a central data provided by a portable computing platform to perform telephone number translation based upon a current serving region of the mobile communications device. The mobile communications device and the portable computing platform exchange local phone number translation information via a communications link. The mobile communications device obtains base station identification information that uniquely identifies a base station, and supplies this unique identifier to the portable computing platform to receive corresponding local phone number translation information. To provide for cache coherency that does not force a waiting time upon the user, the mobile communications device may optionally load local phone number translation information for neighboring base stations. In this case, the local phone number translation information is already present in the cache when the mobile communications device roams from one service area to another. Neighboring local phone number translation information may be optionally deleted from the memory of the mobile communications device to free up memory resources.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for direct call database management for a mobile device, the method comprising:

providing a central database for local phone number translation, the central database external to the mobile device;

providing a communications link between the mobile device and the central database;

obtaining first identification information from at least a first base station within the receiving range of a mobile device;

utilizing the communications link to extract first local phone number translation information from the central database according to the first identification information; and enabling local phone number translation for the mobile device according to the first local phone number translation information.

2. The method of claim 1 further comprising:

obtaining second identification information from at least a second base station within the receiving range of the mobile device;

utilizing the communications link to extract second local phone number translation information from the central database according to the second identification information; and enabling local phone number translation for the mobile device according to the second local phone number translation information.

3. The method of claim 2 wherein the first local phone number translation information and the second local phone number translation information are loaded into a memory of the mobile device, and the mobile device performs the local phone number translation.

4. The method of claim 3 further comprising the first local phone number translation information being removed from the memory of the mobile device in response to the second local phone number translation information being loaded into the memory of the mobile device.

5. The method of claim 3 further comprising:
the mobile device camping on the first base station;
obtaining third identification information of a third base station that neighbors the first base station;
utilizing the communications link to load into the memory of the mobile device third local phone number translation information from the central database for the third base station according to the third identification information;
the mobile device camping on the second base station;
obtaining fourth identification information for a fourth base station that neighbors the second base station; and
utilizing the communications link to load into the memory of the mobile device fourth local phone number translation information from the central database for the fourth base station according to the fourth identification information.

6. The method of claim 5 further comprising:
determining that the third base station does not neighbor the second base station; and
removing from the memory of the mobile device the third local phone number translation information.

7. The method of claim 5 further comprising:
detecting the mobile device switching to the second base station; and
in response to the mobile device switching to the second base station, extracting the fourth local phone number translation information from the central database.

8. The method of claim 5 further comprising utilizing a Broadcast Channel Allocation (BA) List to determine neighboring base stations.

9. The method of claim 5 further comprising the mobile device performing frequency scanning to detect neighboring base stations.

10. The method of claim 1 wherein the central database is provided by a portable computing device that is in communications with the mobile device.

11. The method of claim 10 wherein the portable computing device is a personal data assistant or a portable computer.

12. A mobile wireless device comprising:
a central processing unit (CPU);
communications circuitry to enable the CPU to communicate with an external device; and
memory to provide program code and working data to the CPU, the program code capable of causing the CPU to perform the following steps:
obtaining first identification information from at least a first base station within the receiving range of the mobile wireless device;
utilizing the communications circuitry to obtain first local phone number translation information from a central database provided by the external device, the first local phone number translation information provided according to the first identification information; and
enabling local phone number translation according to the first local phone number translation information.

13. The mobile wireless device of claim 12 wherein the program code is further capable of causing the CPU to perform the following steps:

obtaining second identification information from at least a second base station within the receiving range of the mobile device;
utilizing the communications circuitry to obtain second local phone number translation information from the central database according to the second identification information; and
enabling local phone number translation according to the second local phone number translation information.

14. The mobile wireless device of claim 13 wherein the program code is further capable of causing the CPU to remove the first local phone number translation information from the memory in response to the second local phone number translation information being loaded into the memory.

15. The mobile wireless device of claim 14 wherein the program code is further capable of causing the CPU to perform the following steps:
causing the mobile device to camp on the first base station;
obtaining third identification information of a third base station that neighbors the first base station;
utilizing the communications circuitry to load into the memory third local phone number translation information from the central database for the third base station according to the third identification information;
causing the mobile device to camp on the second base station;
obtaining fourth identification information for a fourth base station that neighbors the second base station; and
utilizing the communications circuitry to load into the memory fourth local phone number translation information from the central database for the fourth base station according to the fourth identification information.

16. The mobile wireless device of claim 15 wherein the program code is further capable of causing the CPU to perform the following step:
in response to determining that the third base station does not neighbor the second base station, removing from the memory the third local phone number translation information.

17. The mobile wireless device of claim 15 wherein the program code is further capable of causing the CPU to perform the following steps:
detecting the mobile device switching to the second base station; and
in response to the mobile device switching to the second base station, extracting the fourth local phone number translation information from the central database.

18. The mobile wireless device of claim 15 wherein the program code utilizes a Broadcast Channel Allocation (BA) List to determine neighboring base stations.

19. The mobile wireless device of claim 15 wherein the program code causes the mobile device to perform frequency scanning to detect neighboring base stations.

20. The mobile wireless device of claim 12 wherein the external device is a personal data assistant or a portable computer.

* * * * *